# (12) United States Patent
Ossim et al.

(10) Patent No.: US 11,386,683 B1
(45) Date of Patent: Jul. 12, 2022

(54) DETECTION AND RECOGNITION OF OVERLAID CONTENT WITHIN VIDEO CONTENT

(71) Applicant: Amazon Technologies, Inc., Seattle, WA (US)

(72) Inventors: David John Ossim, Seattle, WA (US); Hooman Mahyar, Kirkland, WA (US); Domenic Rigoglioso, Wayne, NJ (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 337 days.

(21) Appl. No.: 16/674,493

(22) Filed: Nov. 5, 2019

(51) Int. Cl.
| | | |
|---|---|---|
| G06V 30/148 | (2022.01) |
| G06K 9/62 | (2022.01) |
| G06T 7/11 | (2017.01) |
| G06V 10/26 | (2022.01) |
| G06V 20/40 | (2022.01) |
| G06V 10/764 | (2022.01) |
| G06V 30/19 | (2022.01) |

(52) U.S. Cl.
CPC ......... *G06V 30/153* (2022.01); *G06K 9/6269* (2013.01); *G06T 7/11* (2017.01); *G06V 10/267* (2022.01); *G06V 10/764* (2022.01); *G06V 20/46* (2022.01); *G06V 30/19173* (2022.01)

(58) Field of Classification Search
CPC ......... H04N 21/4312; H04N 21/43615; H04N 21/4728; H04N 21/440245; H04N 21/440263; H04N 21/4725; H04N 21/485; H04N 21/4854; G06F 16/55; G06V 10/267; G06V 10/764; G06V 20/46; G06V 30/153; G06V 30/19173; G06K 9/6269; G06T 7/11
See application file for complete search history.

(56) References Cited

U.S. PATENT DOCUMENTS

| | | | | |
|---|---|---|---|---|
| 11,138,440 B1* | 10/2021 | Wang | ................. | G06K 9/00718 |
| 2012/0177249 A1* | 7/2012 | Levy | ................. | G06K 9/00711 |
| | | | | 382/103 |
| 2015/0186731 A1* | 7/2015 | Sun | ................. | G06K 9/00744 |
| | | | | 382/103 |
| 2015/0287213 A1* | 10/2015 | Feris | ................. | G06K 9/00771 |
| | | | | 382/103 |
| 2020/0204864 A1* | 6/2020 | Aggarwal | .......... | H04N 21/4725 |

* cited by examiner

*Primary Examiner* — Nay A Maung
*Assistant Examiner* — Jose M Torres
(74) *Attorney, Agent, or Firm* — Eversheds Sutherland (US) LLP

(57) ABSTRACT

Technologies are provided for the detection and recognition of overlaid content within video content. Some embodiments include a computing system that can receive data defining a sequence of frames corresponding to video content. The sequence of frames spans a defined time interval. The computing system can determine image changes between contiguous images defined by contiguous frames in the sequence of frames. A subset of the image changes can indicate static content within the video content, and another subset of the image changes can indicate non-static content. The computing system can then generate a composite image using at least the image changes, where the composite image includes an area representing the static content. Using the composite image, the computing system can classify the area as a defined visual element. Examples of the defined visual element include a logo and text.

18 Claims, 8 Drawing Sheets

DETECTION AND RECOGNITION OF OVERLAID CONTENT WITHIN VIDEO CONTENT

BACKGROUND

Digital video content is rich in structure (color, texture, shadowing, etc.) and can be augmented with different types of digital visual elements. Those visual elements are commonly laid over digital media that forms the video content. Some visual elements are added to video content in order to aid in the consumption of the video content. Such is the case of subtitles and augmented-reality (AR) markings, for example. Other visual elements, such as brand logos or other symbols, are added for branding purposes and to some extent, to inform a consumer of a source of the video content.

As digital content becomes more ubiquitous and sources of video content proliferate, not all video content includes metadata that characterizes the video content. In other situations, while such metadata exists it may not be available to a content supplier service, such as a video streaming service.

Generating metadata characterizing video content by analyzing the video content is computationally intensive, demanding a substantial amount of computing resources, such as compute time, computational power, storage, and network bandwidth. The significant computational demand associated with analyzing video content still prevails even when applying advanced techniques to identify digital content laid over video content.

Therefore, much remains to be improved in technologies for detection and recognition of particular objects within video content. More specifically, several technical challenges remain to be addressed in the detection and recognition of overlaid content within video content.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, amongst other technical challenges, the issue of detection and recognition of overlaid content within video content. The overlaid content includes digital visual elements that are added over digital images that form the video content. The added digital visual elements can replace image content originally present in the digital images. Embodiments of the disclosed technologies isolate static content by reducing the complexity of video content while emphasizing the isolated static content. The isolated static content can then be classified efficiently by means of a machine-learning model, optical character recognition (OCR) techniques, or similar. More particularly, embodiments of the disclosed technologies include a computing system that can receive data defining a sequence of frames corresponding to video content. The sequence of frames spans a defined time interval. The computing system can determine image changes between contiguous images defined by contiguous frames in the sequence of frames. A subset of the image changes can indicate static content within the video content, and another subset of the image changes can indicate non-static content. The computing system can then generate a composite image using at least the image changes, where the composite image includes an area representing the static content. Using the composite image, the computing system can classify the area as a defined visual element. Examples of the defined visual element include a brand logo; textual markings, such as subtitles or other text; or similar content.

Embodiments of the technologies disclosed herein improve performance of video processing systems in numerous ways. For example, by isolating static elements within video content, the complexity and amount of data utilized to detect and identify digital content laid over the video content are dramatically reduced. As a result, the amount of computational resources needed to generate metadata that characterizes the video content decreases dramatically. Speed-up factors of the order of 100 also can be achieved in the processing of video content.

Figure 1:
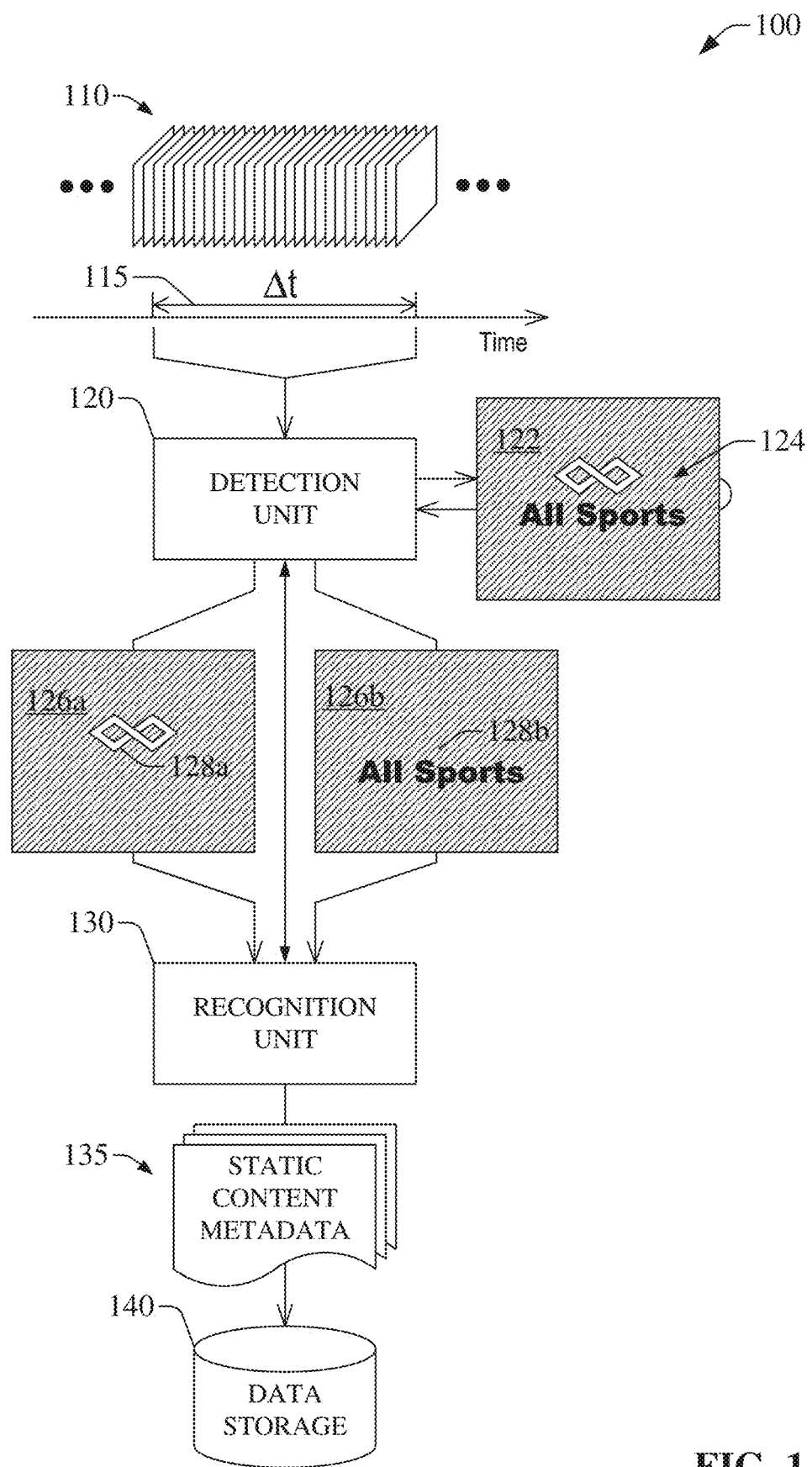
FIG. 1 illustrates an example of an operational environment for the detection and recognition of overlaid content within video content, in accordance with one or more embodiments of this disclosure.

With reference to the drawings, FIG. 1 is a schematic block diagram of an example of an operational environment 100 for the detection and recognition of overlaid content within video content, in accordance with one or more embodiments of this disclosure. The video content can be generated from various sources, such as a video streaming service or a broadcasting network platform. The video content can be time-shifted video content or live video content. The video content includes, for example, digital media that form a video asset of a defined duration. The video asset can be a feature motion picture, a feature animation, or another type of video segment. In some instances, the digital media can be directed content or another type of digital content (such as a recorded broadcast of a sports event or a live broadcast of a music concert). The video content also can include a combination of directed content and another type of digital content. For the purpose of illustration, directed content refers to digital media configured for a particular audience and/or a particular outlet channel, such as a website, a streaming service, or a mobile application. Directed content can include, for example, any type of digital media, such as advertisement; motion pictures, animations, or other types of video segments; video games; podcasts; and the like.

The operational environment 100 includes a detection unit 120 that can acquire video data defining a sequence of frames 110 corresponding to video content. The sequence of frames 110 spans a defined time interval $\Delta t$ 115 that can be less than the duration of the video asset that contains the video content. In some instances, the video asset can be a video segment of a particular duration T (a real number in units of time; 10 s, 20 s, or 30 s, for example). The video segment can embody an advertisement, a gardening academic tutorial, or an academic tutorial, for example. In other instances, the video asset can be a live stream of video content, such as a soccer match or a political campaign rally.

The defined time interval $\Delta t$ 115 is configured prior to the acquisition of the sequence of frames 110. The magnitude of the defined time interval $\Delta t$ 115 can be in a range from hundreds of milliseconds to tens of seconds (e.g., 10 s). Such a magnitude also can be specific to the type of static content that is being detected. For example, the magnitude of $\Delta t$ for detection of subtitles can be less than the magnitude of $\Delta t$ for detection of logos or other types of symbols. In some configurations, the defined time interval $\Delta t$ 115 can be determined empirically by implementing the detection and recognition principles disclosed herein using different magnitudes of a time interval during which the detection unit 120 acquires video data. A particular magnitude can then be selected based on particular performance of the detection and recognition of labeled visual elements.

The detection unit 120 can utilize the sequence of frames 110 to determine if static content is present within the video content associated with the sequence of frames 110. Determining that static content is present in the video content can serve as a proxy for detecting overlaid content in the video content. In order to determine if static content is present within the video content, the detection unit 120 can determine image changes between contiguous images defined by respective contiguous frames in the sequence of frames 110. In one configuration, contiguous frames can be consecutive frames; namely, a first frame is immediately next in sequence to a contiguous second frame. In other words, a third frame is not present between the first frame and the contiguous second frame. In another configuration, contiguous frames can be near in time and separated by a defined number of intervening frames (e.g., one intervening frame, two intervening frames, or more than two intervening frames). For instance, a first frame can be near—but not immediately next—in time to a contiguous second frame, with two other frames present between the first frame and the contiguous second frame. By considering intervening frames in the selection of contiguous frames, a determination of image changes between contiguous frames can reduce the compute time to detect static content within video content.

Figure 2:
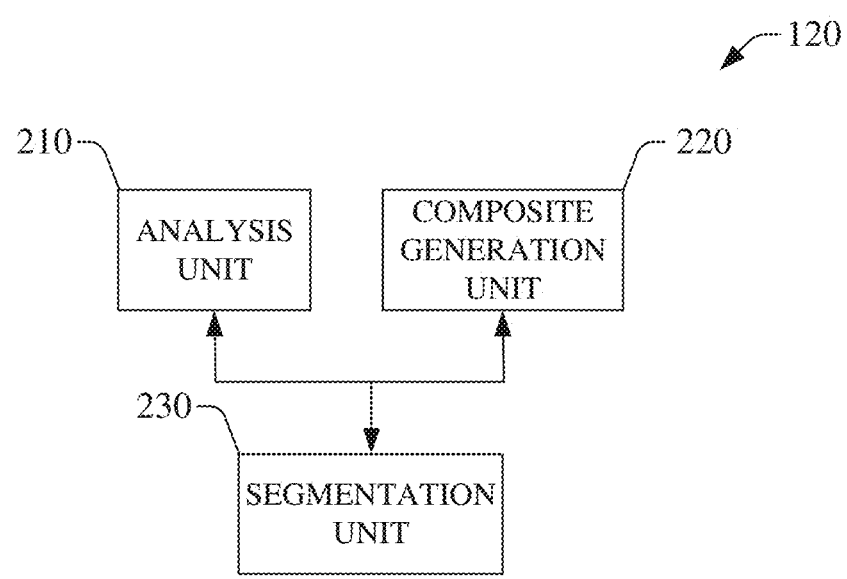
FIG. 2 illustrates an example of a unit for detection of overlaid content within video content, in accordance with one or more embodiments of this disclosure.

An image change between an image represented by a first frame and another image represented a contiguous second frame in the sequence of frame 110 is a quantity that depends on position in a frame coordinate system common to both the first and second frame. In some embodiments, as is illustrated in FIG. 2, the detection unit 120 includes an analysis unit 210 that can determine image changes between contiguous images defined by contiguous frames.

Accordingly, the image change can be represented by a quantity $\Delta=\Delta(R)$, where R is a position in the frame coordinate system. Because video content typically is rich in structure (color, texture, shadowing, etc.), the detection unit 120 can utilize pooling instead of determining the image change $\Delta$ on a pixel-by-pixel basis. Accordingly, the detection unit 120 can configure a lattice of positions $\{R_1, R_2, \ldots R_{N-1}, R_N\}$, each one of the positions corresponding to a square tile, for example, having a side that spans multiple pixels, instead of a single pixel. The number m of pixels spanned by each square tile can be referred to as a stride size, simply for the sake of nomenclature. Here, m is a natural number greater than unity. Tiles of other shapes, such as rectangles or hexagons, also can be utilized to generate a tiling of a tiling of a frame.

In order to determine $\Delta^{(\kappa)}{}_J(R_J)$ for J=1, 2 ... N−1, N, for a pair of contiguous frames identified with the index $\kappa$, the detection unit 120 can determine a value $f^{(a)}(R_J)$ corresponding to the J-th square tile for the first frame a. Here, k can be a composite index that identifies a pair of contiguous frames a and b; namely, the first frame a and the contiguous second frame b. The function $f(\bullet)$ is a pooling function that can be single-valued and represents the image content of the m pixels contained in the J-th square tile (with J=1, 2 ... N−1, N). Without intending to be bound by theory and/or modeling, the pooling function can average pixel values (e.g., color values or brightness values) over the m pixels contained in a square tile. The average value is the value of the pooling function for the square tile and represents the image content of the square tile. In addition, the detection unit 120 can determine another value $f^{(b)}(R_J)$ representative of the other image content corresponding to the J-th square tile in the contiguous second frame b. The detection unit 120 can thus determine $\Delta^{(\kappa)}{}_J=\Delta^{(\kappa)}{}_J(R_J)$ for each square tile J in order to assess the image change between the image represented by the first frame and the contiguous second frame in the sequence of frame 110. In some embodiments, the analysis unit 210 (FIG. 2) determines $\Delta^{(\kappa)}{}_J$.

Figure 3A:
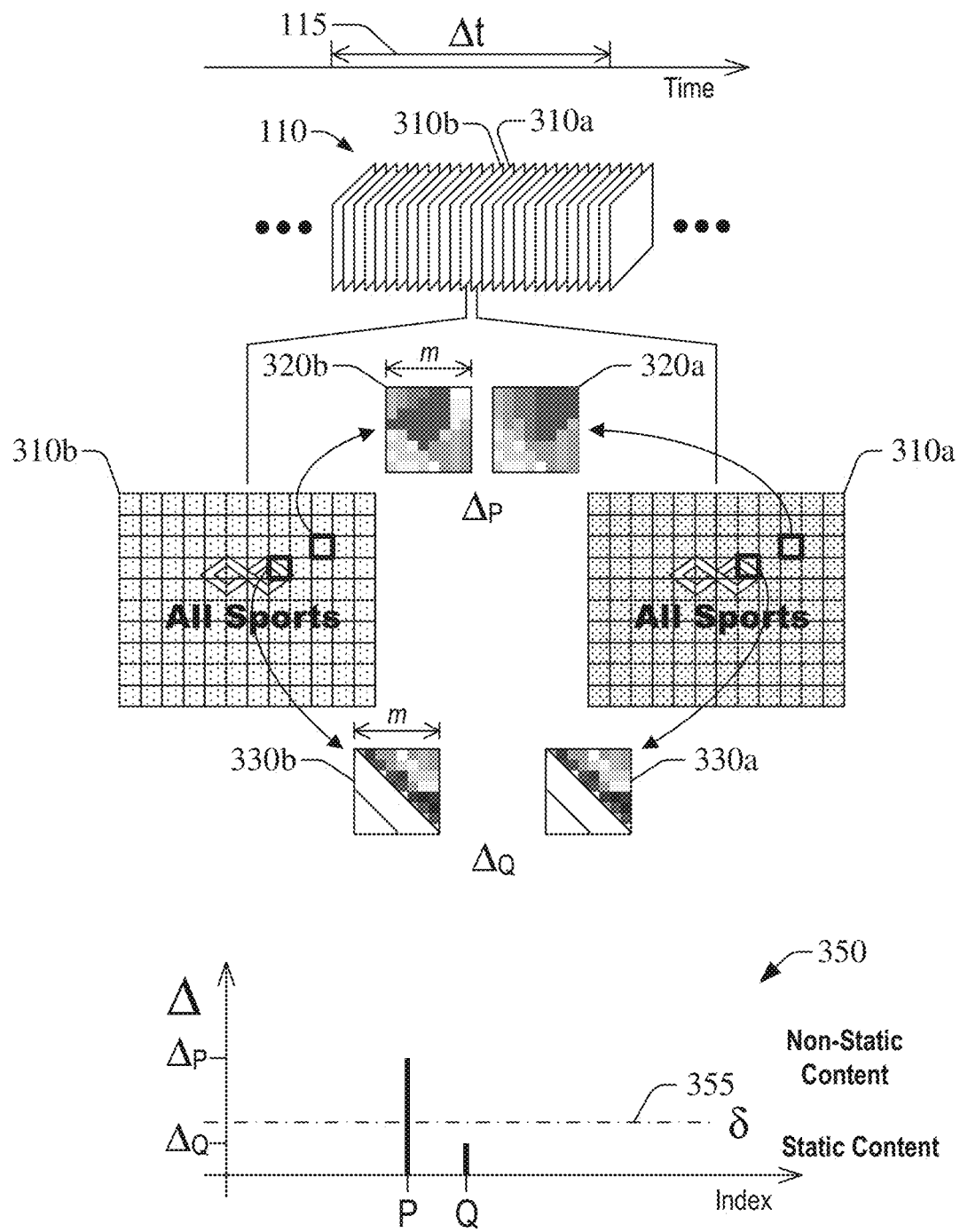
FIG. 3A schematically depicts a determination of image changes between contiguous frames in a sequence of frames corresponding to video content, in accordance with one or more embodiments of the disclosure.

Simply as an illustration, FIG. 3A schematically depicts a determination of $\Delta^{(\kappa)}{}_J$ for a pair of contiguous frames. The detection unit 120 (not shown in FIG. 3) can select a first frame 310a and a contiguous second frame 310b from the sequence of frames 110. Respective images for the first frame 310a and the contiguous second frame 310b can include static content, which content is represented by a logo and text. Such images also include non-static content represented by steeples of different density. The first frame 310a and the contiguous second frame 310b are depicted as being consecutive, without an intervening frame. Each one of the first frame 310a and the contiguous second frame 310b can be logically partitioned into a tiling of square tiles. Although N=120 square tiles are shown, another number of tiles that is greater than 120 or less than 120 can be utilized.

The detection unit 120 can then determine an image change for each tile. For a tile P (represented as 320b, 320a) in each of the contiguous frames, dissimilar non-static content is present and a particular value $\Delta_P$ is determined. For a tile Q (represented as 330b, 330a) in each of the contiguous frames, static content is present and another particular value $\Delta_Q$ is determined. Because static content present in the tile Q, $\Delta_P$ can be greater than $\Delta_Q$, as is shown in the diagram 350 in FIG. 3A.

The detection unit 120 can determine $\Delta^{(\kappa)}{}_J$ for J=1, 2 . . . N−1, N for each pair of contiguous frames κ in the sequence of frames 110. As a result, for M of such pairs, the detection unit 120 can generate a series of image changes $\{\Delta^{(\kappa)}{}_J\}$, with κ=1, 2, . . . , M. Accordingly, when the video content that is static (e.g., a portion of an overlaid mark or a portion of an overlaid text) is present within the square tile J, the series of values $\{\Delta^{(\kappa)}{}_J\}$ can be similar, if not essentially the same, and can be bound from above. In other words, each one of the image changes determined for a tile containing static content can be less than a threshold amount. In contrast, when video content that is static is essentially absent from the square tile J, the series of values $\{\Delta^{(K)}{}_J\}$ can be different and can be bound from below. In some embodiments, the analysis unit 210 (FIG. 2) determines the series of values $\{\Delta^{(\kappa)}{}_J\}$.

By determining a series of image changes $\{\Delta^{(\kappa)}{}_J\}$ over contiguous frames in the sequence of frames 110, the detection unit 120 can discriminate between image portions including (or likely including) static content and other portions that lack (or likely lack) static content across the sequence of frames 110. The detection unit 120 can discriminate in such a manner by comparing an image change $\Delta^{(\kappa)}{}_J$ for the J-th tile in a frame of pair of contiguous frames κ with a threshold amount δ. When the comparison yields $\Delta^{(\kappa)}{}_J$ equal to or greater than the threshold amount, for example, the J-th tile can be identified as lacking static content. Conversely, when the comparison yields $\Delta_J$ less than the threshold amount, the J-th tile can be identified as containing static content. The diagram 350 in FIG. 3A illustrates such a distinction between static content and non-static content using a schematic threshold amount 355.

Therefore, the detection unit 120 can utilize the series of image changes $\{\Delta^{(\kappa)}{}_J\}$ over contiguous frames in the sequence of frames 110 to generate a representation of static content across the time interval Δt 115. Such a representation can be generated by replacing non-static content with a particular background content and retaining static content across such a sequence. The background content can be, for example, a transparent background or a blurred background. Such a replacement of non-static content by background content de-emphasizes the non-static content from the video content corresponding to the sequence of frames 110. The background content can thus be referred to as de-emphasized background. Static content can be more readily identifiable as a result of de-emphasizing the non-static content. In some embodiments, as is illustrated in FIG. 2, the detection unit 120 includes a composite generation unit 220 that can generate the representation of static content across the time interval Δt 115 or another time interval utilized for detection of static content.

Figure 3B:
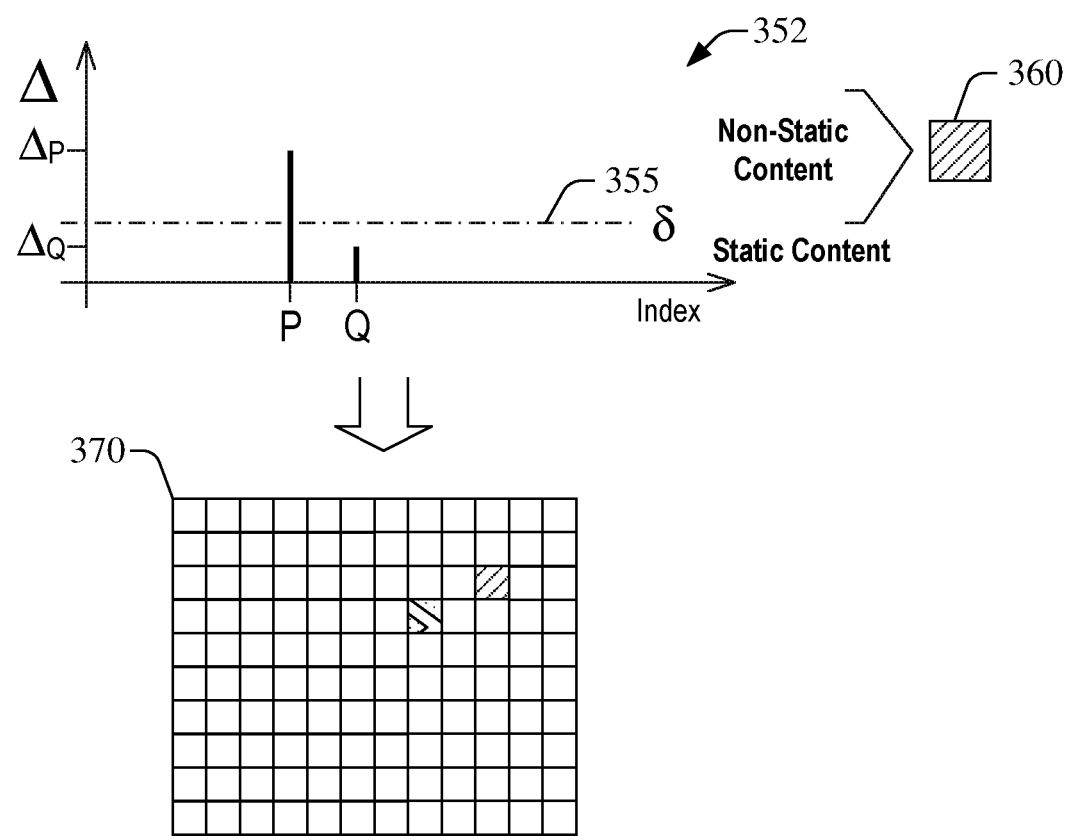
FIG. 3B illustrates an example of replacement and retention of image content in a composite frame, in accordance with one or more embodiments of the disclosure.

Simply as an illustration, diagram 352 in FIG. 3B illustrates replacement of image content in tile P in FIG. 3A with a tile 360 containing background content (depicted as a hatched square). The diagram 352 also illustrates retention of image content for tile Q in FIG. 3A. The composite generation unit 220 (FIG. 2) can update a single image frame 370 with replacement image content and actual image content.

More concretely, to generate the representation of static content across the sequence of frames 110, the detection unit 120 can configure a single image frame to consolidate the video content in such a sequence. The single image frame (e.g., frame 370, FIG. 3C) can be referred to as a composite frame, and is logically partitioned into a tiling corresponding to the tiling utilized to determine image changes $\{\Delta_J\}$ (with J=1, 2, . . . N, where N is a natural number). As such, the tiling spanning the composite frame can have N tiles arranged in a square lattice, for example. The N tiles have respective positions $\{R_1, R_2, \ldots R_{N-1}, R_N\}$ within the composite frame.

For a first frame and a second frame contiguous to the first frame in the sequence of frames 110, the detection unit 120 can compare each value $\Delta_J(R_J)$, with J=1, 2 . . . N−1, N, to a threshold value δ. Each comparison can result in image content from the first frame, in a currently analyzed tile, being replaced or retained: $\Delta_J(R_J) \geq \delta$ results in the image content being replaced by defined background content, and $\Delta_J(R_J) \leq \delta$ results in the image content being retained. In response to each comparison, the detection unit 120 can update the composite frame accordingly. Specifically, when $\Delta_J(R_J) \geq \delta$, the image content in the J-th tile in the composite frame is configured to the defined background content, and when $\Delta_J(R_J) \leq \delta$, the image content in such a tile is configured to the image content present in the first frame in the corresponding tile. In one configuration, pixel values of respective pixels in the corresponding tile can be configured as pixel values of respective pixels in the J-th tile in the composite frame. It is noted that other update protocols for retaining image content also can be utilized. For example, the image content that is configured for the J-th tile in the composite frame can be a weighted combination of first image content and second image content in corresponding tiles in the first frame and contiguous second frame. In some embodiments, the composite generation unit 220 (FIG. 2) implements the update protocol utilized to update the composite frame.

For the second frame and a third frame contiguous to the second frame in the sequence of frames 110, the detection unit 120 can compare each value $\Delta_J(R_J)$, with J=1, 2 . . . N−1, N, to the threshold value δ. Each comparison can result in image content from the second frame, in a currently analyzed tile, being replaced or retained: $\Delta_J(R_J) \geq \delta$ results in the image content being replaced by the defined background content, and $\Delta_J(R_J) < \delta$ results in the image content being retained. In response to each comparison, the detection unit 120 can again update the composite frame accordingly. Specifically, when $\Delta_J(R_J) \geq \delta$, the image content in the J-th tile in the composite frame is configured to the defined background content, and when $\Delta_J(R_J) < \delta$, the image content in such a tile is configured to the image content present in the second frame in the corresponding tile. Again, in one configuration, pixel values of respective pixels in the corresponding tile can be configured as pixel values of respective pixels in the J-th tile in the composite frame. In such an update protocol, static content in the consolidated frame is replaced by image content in a prior contiguous frame. As mentioned, other update protocols for retaining image content also can be utilized. In particular, in one of those other update protocols, the static content can be accumulated instead of being fully replaced. Again, in some embodiments, the composite generation unit 220 (FIG. 2) implements the update protocol utilized to update the composite frame.

Regardless of the type of update protocol, the detection unit 120 can iterate across the sequence of frames 110, evaluating image changes between contiguous image frames and updated the composite frame as is described herein. As a result, the detection unit 120 can generate a single composite frame that consolidates static content from the sequence of frames 110. The consolidated frame represents a consolidated image that can include one or many areas corresponding to the static content. The composite frame thus constitutes a representation of such static content across the time interval Δt 115.

Simply as an illustration, the sequence of frames 110 can be a part of the last three seconds of an advertisement. The video content represented by such a sequence during that time interval can include a name of a company ("All Sports," simply for the sake of illustration) and a company logo being displayed over a panning video of a mountain trail. The detection unit 120 can process that particular example sequence of frames 110 and can generate a composite frame 122. As is illustrated in FIG. 1, the composite frame 122 can represent a composite image including a transparent or blurred background (represented with a hatched area) that de-emphasizes the mountain trail. The composite image also includes static elements 124 across the time interval Δt 115. The static elements 124 include the company name and the company logo (shown as connected rhombuses, merely as an example).

In some instances, the composite image represented by a composite frame generated by the detection unit 120 can include multiple areas corresponding to static content. As is illustrated in FIG. 1, a company logo and a company name can be present in the composite image. In such instances, the detection unit 120 can segment the composite image according to the multiple areas. Specifically, the detection unit 120 can generate multiple composite images representing respective segments of the composite image. Each of the multiple composite images can be analyzed to identify an area of static content as a defined static element, such as text or a logo. Such an area can be identified by utilizing various image analysis techniques, such as edge detection. In some embodiments, as is illustrated in FIG. 2, the detection unit 120 includes a segmentation unit 230 that can determine segments of a composite image represented by a composite frame generated by the detection unit 120.

As is illustrated in FIG. 1, the detection unit 120 can segment the composite frame 122 into two segments: a first composite image 126a and a second composite image 126b. The first composite image 126a includes a de-emphasized background (represented with a hatched area) and an area spanning the company logo 128a. The second composite image 126b includes a de-emphasized background (also shown as a hatched area) and an area spanning a company name 128b.

Figure 4:
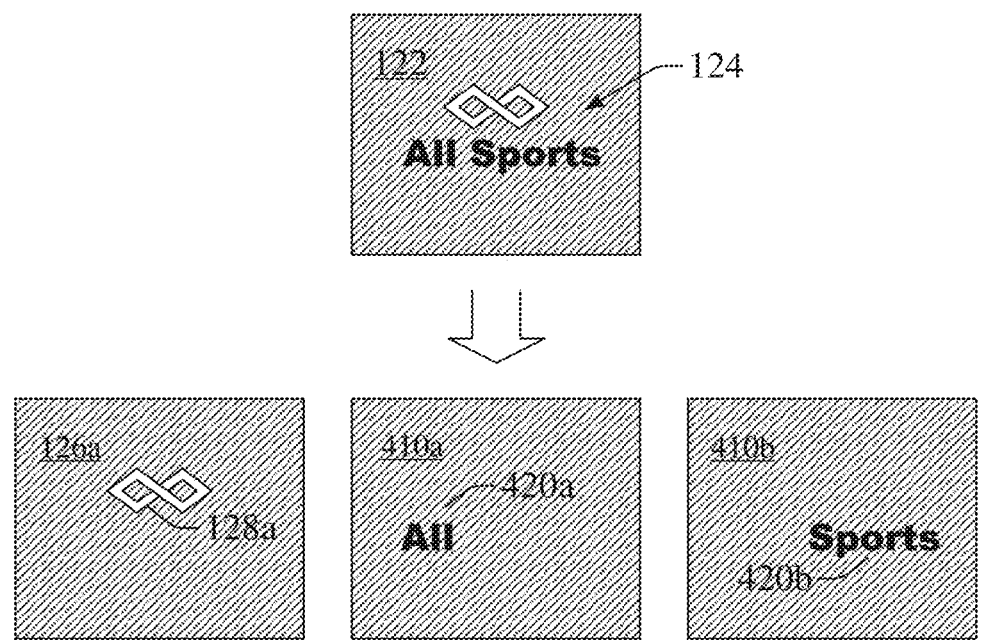
FIG. 4 illustrates an example of composite images for the detection and recognition of overlaid content within video content, in accordance with one or more embodiments of this disclosure.

Another type of segmentation of the composite frame 122 also can be implemented, as is shown in FIG. 4. The detection unit 120 can segment the composite frame 122 into three segments: the first composite image 126a, a second composite image 410a, and a third composite image 410b. The second composite image 410a includes a de-emphasized background (shown as a hatched area in FIG. 4) and an area spanning a first portion 420a of the company name included in the composite frame 122. The third composite image 410b also includes a de-emphasized background (also shown as a hatched area) and an area spanning a second portion 420b of the company name.

Regardless of its type, the segmentation of the composite frame 122 can conclude the detection of overlaid elements in the video content corresponding to the sequence of frames 110. By reducing the sequence of frames 110 to individual segments of the consolidated frame, the detection unit 120 can reduce the computational demand to recognize static elements within video content relative to conventional video processing systems. The amount of computational resources utilized to analyze the determined segments can be reduced by a factor proportional to the number of frames in the sequence of frames 110, for example.

As is illustrated in FIG. 1, the detection unit 120 can send segments generated using the composite frame 122 to a recognition unit 130 for identification of respective static elements in the segments. The recognition unit 130 can receive composite image corresponding to a segment and can classify static content within the composite image as a defined visual element. Examples of the defined visual element include a logo of a particular company; particular text, such as subtitles in a particular language or other types of textual markings; or similar. In one example configuration, the recognition unit 130 can receive the first composite image 126a and can classify the visual element 128a as the logo of the "All Sports" company. In another example configuration, the recognition unit 130 can receive the second composite image 126b and can classify the visual element 128b as text identifying the "All Sports" company.

The recognition unit 130 can classify static content within a segment in numerous ways. In some embodiments, the recognition unit 130 can classify the static content by applying a machine-learning classification model to the composite image corresponding to the segment. The machine-learning classification model can define an unsupervised learning convolutional neural network (CNN). Simply as an illustration, the CNN can include a few hidden layers of neurons (e.g., one hidden layer of neurons, two hidden layers of neurons, or three hidden layers of neurons). When present, two hidden layers of the CNN can be partially connected or fully connected. The machine-learning classification model can identify a particular visual element from multiple labeled visual elements. The recognition unit 130 can thus identify the static content in the composite image as the particular visual element (e.g., a logo or another type of symbol). In other embodiments, the recognition unit 130 can classify the static content by applying an optical character recognition (OCR) technique to the composite image corresponding to the segment.

As part of classifying static content within in a composite image corresponding to a segment, the recognition unit 130 can generate metadata 135 characterizing features of a visual element identified using the composite image. The metadata 135 can include, for example, multiple sets of coordinates and an identifier (ID) for each one of the multiple set of coordinates. Each particular set of coordinates represents a two-dimensional vector that defines a position within the composite image. Some of the coordinates can define a boundary for an area that contains the visual element. In embodiments in which the visual element is a logo, the multiple sets of coordinates define an area that contains the logo within the composite image. In addition, the ID is indicative of an entity (a retailer, a cable television network, etc.) corresponding to the logo. In embodiments in which the visual element is a subtitle, the multiple sets of coordinates define an area that contains the subtitle within the composite image. For instance, four sets of coordinates can define the vertices of a bounding box for the subtitle. The ID can identify a language (Japanese, Spanish, etc.) of the subtitle.

The recognition unit 130 also can send the metadata 135 to a data storage device or a unit of a computing system (not depicted in FIG. 1), or both. The metadata 135 can be utilized in a process for managing video content or another process for generating information on delivery of video content. Such information can include, for example, data identifying a source of the video content, frequency of presentation of the video content, a combination thereof, or similar.

Figure 5:
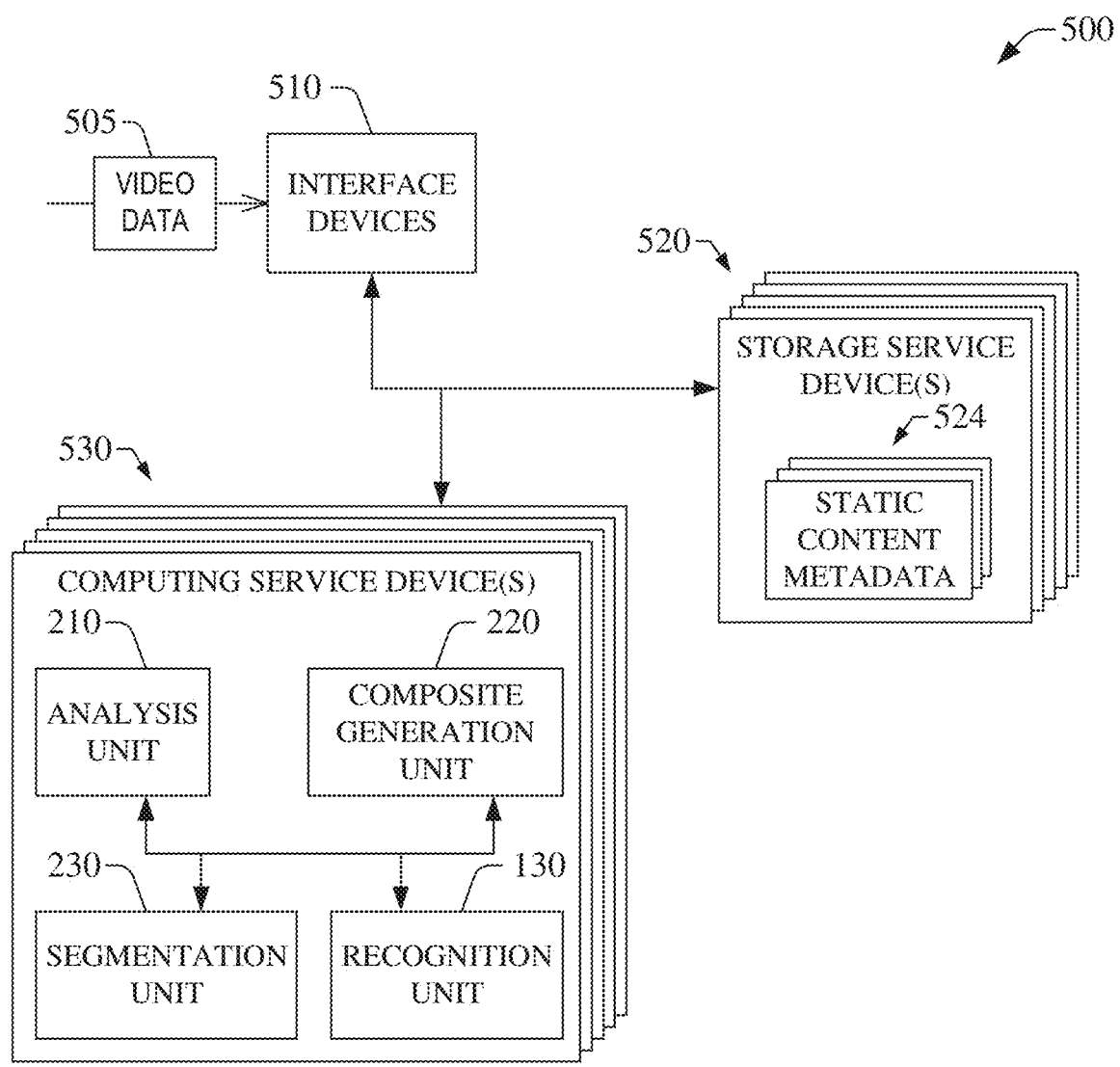
FIG. 5 illustrates an example of a computing system for the detection and recognition of overlaid content within video content, in accordance with one or more embodiments of this disclosure.

FIG. 5 is a schematic block diagram of an example of a computing system 500 for the detection and recognition of overlaid content within video content, in accordance with one or more embodiments of this disclosure. The computing system 500 can detect static content within video content and can classify the static content the according to the detection and recognition approaches disclosed herein. The static content that is detected and classified servers as a proxy for overlaid content in the video content.

The example computing system 500 includes an interface device 510 that can receive video data 505 from a source of video content (not depicted in FIG. 5). The video data 505 can define multiple frames corresponding to video content. The interface devices 510 can include one or many processors functionally coupled to one or many memory devices that can retain a data collection module or another type of content ingestion component (neither one depicted in FIG. 5). In some configurations, the data collection module can include an application programming interface (API) and/or another type of program code that can permit receiving the video data 505 via a function call, for example. At least one of such processor(s) can execute the data access module to receive the video data 505. At least one of the interface devices 510 can send the video data 505 to one or many computing service devices 530 included in the computing system 500.

As is illustrated in FIG. 2, in some embodiments, the computing service device(s) 530 can include the analysis unit 210, the composite generation unit 220, and the segmentation unit 230. Such units can constitute the detection unit 120 (see, e.g., FIG. 2). The computing service device(s) 530 also can include the recognition unit 130. Each of these units can operate in accordance with functionality described herein in connection with the detection and recognition of overlaid content in video content.

At least one of the computing service device(s) 530 can send static content metadata (e.g., metadata 135, FIG. 1) to one or many storage service devices 520 for storage within memory elements 524 (referred to as static content metadata 524). Although not shown in FIG. 5, at least one of the storage service device(s) 520 can retain various types of information derived from the static content metadata 524. Such information can include, for example, data identifying a source of video content, frequency of presentation of particular types of video content, a combination thereof, or similar.

In view of the aspects of the techniques disclosed herein, an example method that can be implemented in accordance with the disclosure can be more readily appreciated with reference to the flowchart in FIG. 5. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action (s), may be required to implement a method in accordance with one or more aspects of the disclosure. Further yet, two or more of the disclosed methods or processes can be implemented in combination with each other, to accomplish one or more functionalities and/or advantages described herein.

It is noted that the methods of the disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

Figure 6:
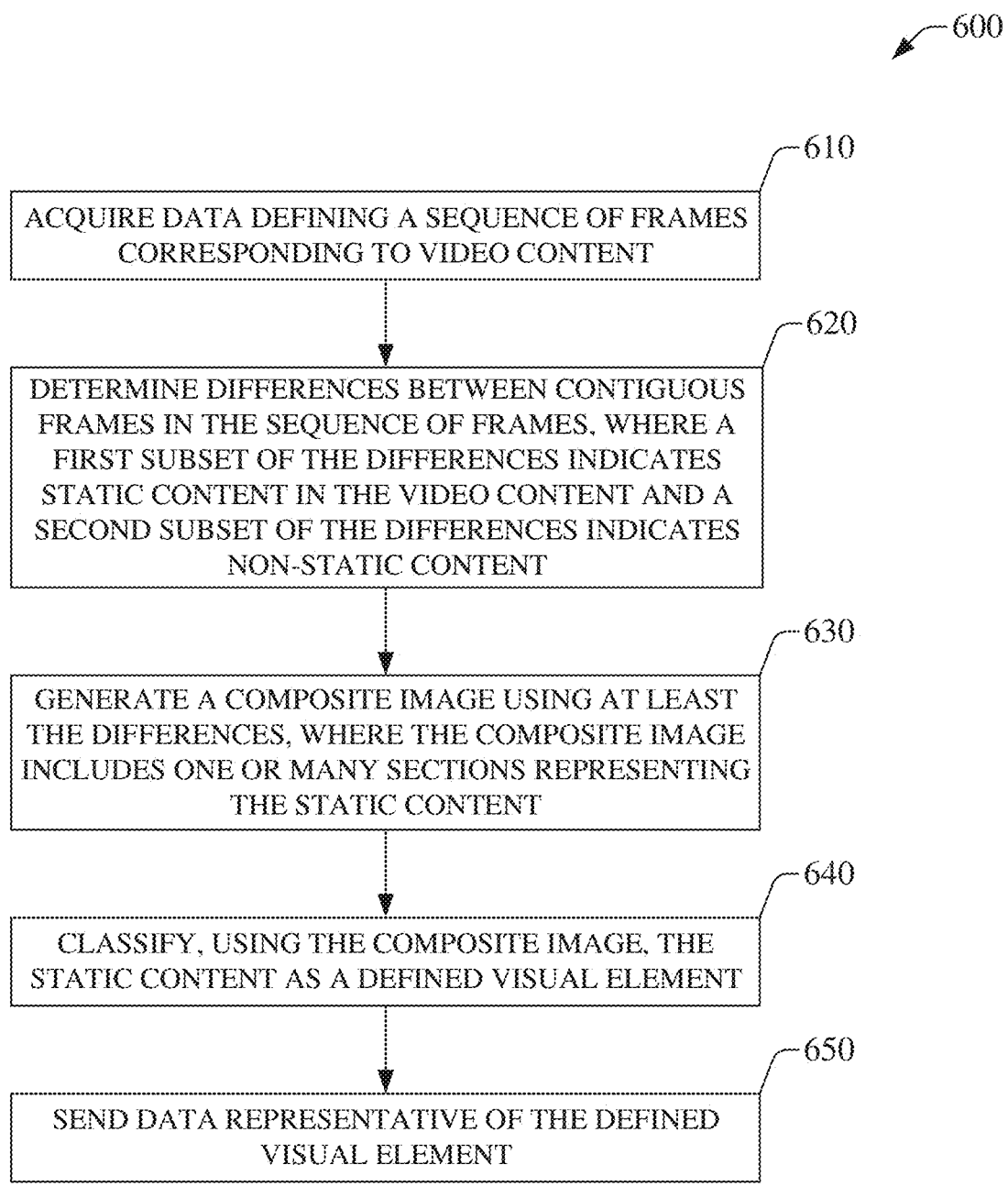
FIG. 6 illustrates an example of a method for detecting and recognizing overlaid content within video content, in accordance with one or more embodiments of this disclosure.

FIG. 6 is a flowchart of an example of a method 600 for detecting and recognizing overlaid content within video content, in accordance with one or more embodiments of this disclosure. In some embodiments, a computing system that has at least one processor and/or is functionally coupled to at least one processor can implement (e.g., compile, execute, compile and execute, etc.) one or more blocks of the example method 600. The computing system also can include one or many memory devices, other types of computing resources, or a combination thereof. Such processor (s), memory device(s), and computing resource(s), individually or in a particular combination, can permit the computing system to implement the example method 600, entirely or partially. The computing resources can include operating system(s); software for configuration and/or control of a virtualized environment; firmware; CPU(s); GPU(s); TPU (s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 600 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can memory device(s) and/or other computing resources. Regardless of the example method 600 being implemented by a distributed or non-distributed computing system, the at least one processor can be functionally coupled to at least one memory device or other types of computer-readable non-transitory storage media.

At block 610, the computing system can acquire data defining a sequence of frames corresponding to video content. The sequence of frames spans a defined time interval. The video content can be time-shifted digital content or live digital content. The video content can include, for example, directed content or other types of digital content (such as a broadcast recording of a sports event or a live broadcast of a music concert). In some instances, the video content can include a combination of directed content and another type of digital content.

At block 620, the computing system can determine differences between contiguous frames in the sequence of frames. A first subset of the differences indicates static content in the video content, and a second subset of the differences indicates non-static content. At block 630, the computing system can generate a composite image using at least the first subset and the second subset of the differences. The composite image can consolidate the static content present in the entire sequence of frames. Accordingly, the composite image includes one or many areas representing the static content. At block 640, the computing system can classify, using the composite image, the static content as a defined visual element, such as a logo or text, for example.

At block 650, the computing system can send data representative of the defined visual element. In embodiments in which the defined visual element is a logo, such data includes multiple sets of coordinates and an ID for each one of the multiple set of coordinates. The coordinates represent a two-dimensional vector that defines a position within the composite image. The ID is indicative of an entity corresponding to the logo.

Figure 7:
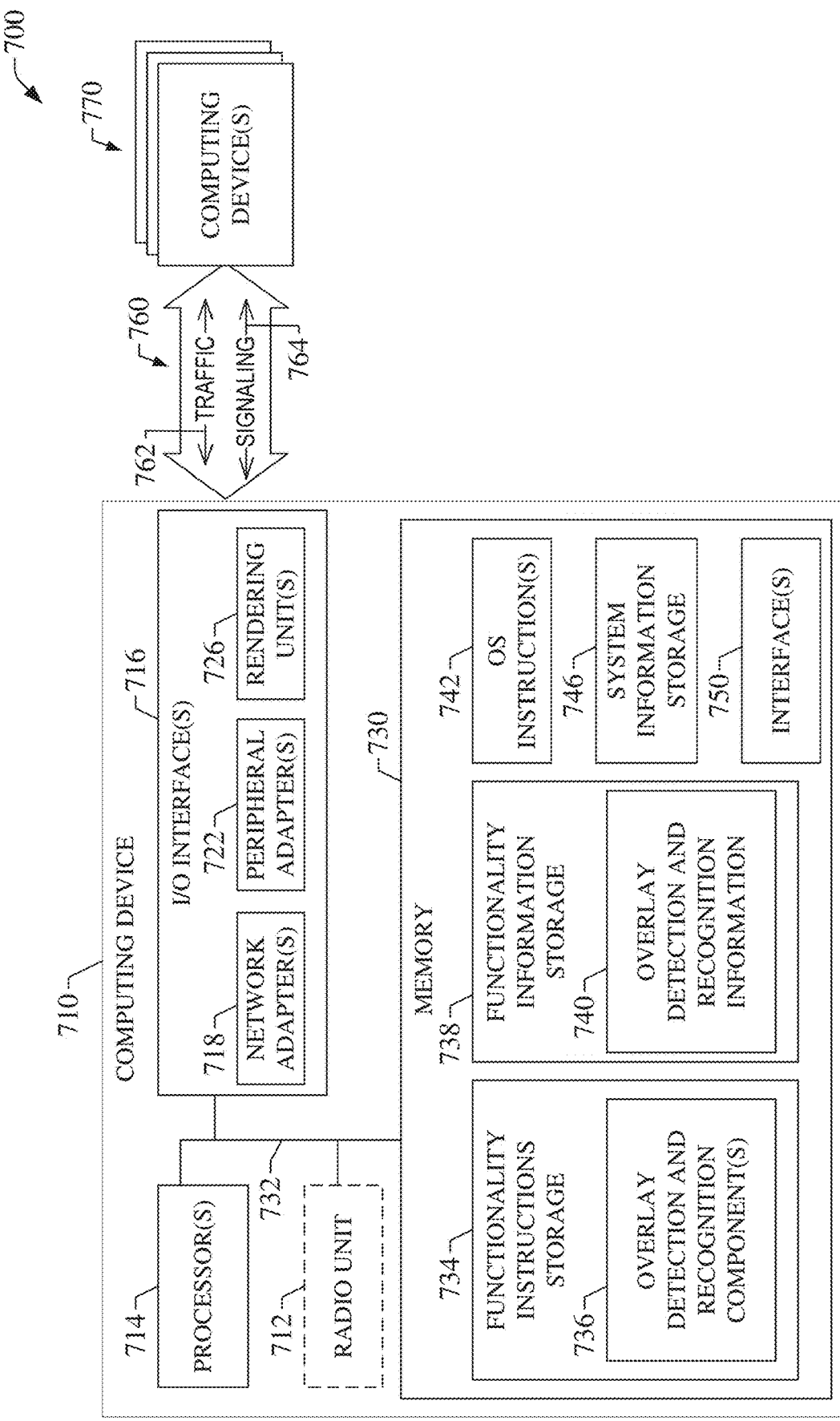
FIG. 7 illustrates an example of a computational environment for the detection and recognition of overlaid content within video content, in accordance with one or more embodiments of the disclosure.

FIG. 7 illustrates a block diagram of an example computational environment 700 for the detection and recognition of overlaid content within video content, in accordance with one or more aspects of the disclosure. The example computational environment 700 is merely illustrative and is not intended to suggest or otherwise convey any limitation as to the scope of use or functionality of the computational environment's architecture. In addition, the illustrative computational environment depicted in FIG. 7 should not be interpreted as having any dependency or requirement relating to any one or combination of components illustrated in the example operational environments of the disclosure. The example computational environment 700 or portions thereof can embody, or can include, for example, one or more of the operational environment 100 or the computing system 500.

The computational environment 700 represents an example implementation of the various aspects or features of the disclosure in which the processing or execution of operations described in connection with the detection and recognition of overlaid content within video content disclosed herein can be performed in response to execution of one or more software components at the computing device 710. It should be appreciated that the one or more software components can render the computing device 710, or any other computing device that contains such components, a particular machine for detection and recognition of overlaid content within video content as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods disclosed herein, such as the example method presented in FIG. 6.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the detection and recognition of overlaid content within video content described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 710 can comprise one or more processors 714, one or more input/output (I/O) interfaces 716, a memory 730, and a bus architecture 732 (also termed bus 732) that functionally couples various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can comprise one or more of network adapter(s) 718, peripheral adapter(s) 722, and rendering unit(s) 726. Such adapter(s) can permit or facilitate connectivity between the external device and one or more of the processor(s) 714 or the memory 730. For example, the peripheral adapter(s) 722 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 718 can functionally couple the computing device 710 to one or more computing devices 770 via one or more traffic and signaling pipes 760 that can permit or facilitate exchange of traffic 762 and signaling 764 between the computing device 710 and the one or more computing devices 770. Such network coupling provided at least in part by the at least one of the network adapter(s) 718 can be implemented in a wired environment, a wireless environment, or both. The information that is communicated by the at least one of the network adapter(s) 718 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 770 can have substantially the same architecture as the computing device 710. In addition or in the alternative, the rendering unit(s) 726 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 710, or can permit conveying or revealing the operational conditions of the computing device 710.

In one aspect, the bus 732 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system. In certain embodiments, such a distributed system can implement the functionality described herein in a client-host or client-server configuration in which the overlay detection and recognition component(s) 736 or the overlay detection and recognition information 740, or both, can be distributed between the computing device 710 and at least one of the computing device(s) 770, and the computing device 710 and at least one of the computing device(s) 770 can execute such components and/or leverage such information.

The computing device 710 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 710, and can comprise, for example, both volatile and non-volatile media, and removable and/or non-removable media. In one aspect, the memory 730 can comprise computer-readable media in the form of volatile memory, such as random access memory (RAM), and/or non-volatile memory, such as read-only memory (ROM).

The memory 730 can comprise functionality instructions storage 734 and functionality information storage 738. The functionality instructions storage 734 can comprise computer-accessible instructions that, in response to execution (by at least one of the processor(s) 714), can implement one or more of the functionalities of the disclosure. The computer-accessible instructions can embody or can comprise one or more software components illustrated as overlay detection and recognition component(s) 736. In one scenario, execution of at least one component of the overlay detection and recognition component(s) 736 can implement one or more of the methods described herein, such as the example method 600. For instance, such execution can cause a processor (e.g., one of the processor(s) 714) that executes the at least one component to carry out a disclosed example method. It should be appreciated that, in one aspect, a processor of the processor(s) 714 that executes at least one of the overlay detection and recognition component(s) 736 can retrieve information from or retain information in one or more memory elements 740 in the functionality information storage 738 in order to operate in accordance with the functionality programmed or otherwise configured by the overlay detection and recognition component(s) 736. The one or more memory elements 740 may be referred to as session configuration information 740. Such information can include at least one of code instructions, information structures, or the like. For instance, at least a portion of such information structures can be indicative of a mapping or categorization of communication session and virtual locations; access rules; and/or preferences for promotional content.

In some embodiments, one or more components of the overlay detection and recognition component(s) 736 can embody or can constitute at least one of the analysis unit 210, the composite generation unit 220, the segmentation unit 230, and the recognition unit 130. As such, the one or more components can operate in accordance with, and can provide the functionality of, the detection unit 120 and recognition unit 130 in accordance with aspects described in this disclosure. In other embodiments, one or more of the overlay detection and recognition component(s) 736 in combination with at least one of the processor(s) 714 can embody or can constitute at least one of the analysis unit 210, the composite generation unit 220, the segmentation unit 230, or the recognition unit 130, and can operate in accordance with, and can provide the functionality of, such units in accordance with aspects described in this disclosure.

At least one of the one or more interfaces 750 (e.g., application programming interface(s)) can permit or facilitate communication of information between two or more components within the functionality instructions storage 734. The information that is communicated by the at least one interface can result from implementation of one or more operations in a method of the disclosure. In certain embodiments, one or more of the functionality instructions storage 734 and the functionality information storage 738 can be embodied in or can comprise removable/non-removable, and/or volatile/non-volatile computer storage media.

At least a portion of at least one of the overlay detection and recognition component(s) 736 or overlay detection and recognition information 740 can program or otherwise configure one or more of the processors 714 to operate at least in accordance with the functionality described herein. One or more of the processor(s) 714 can execute at least one of the overlay detection and recognition component(s) 736 and leverage at least a portion of the information in the functionality information storage 738 in order to provide detection and recognition of overlaid content within video content in accordance with one or more aspects described herein.

It should be appreciated that, in certain scenarios, the functionality instruction(s) storage 734 can embody or can comprise a computer-readable non-transitory storage medium having computer-accessible instructions that, in response to execution, cause at least one processor (e.g., one or more of the processor(s) 714) to perform a group of operations comprising the operations or blocks described in connection with the disclosed methods.

In addition, the memory 730 can comprise computer-accessible instructions and information (e.g., data, metadata, and/or programming code instructions) that permit or facilitate the operation and/or administration (e.g., upgrades, software installation, any other configuration, or the like) of the computing device 710. Accordingly, as illustrated, the memory 730 can comprise a memory element 742 (labeled operating system (OS) instruction(s) 742) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable OS. The memory 730 also comprises system information storage 746 having data, metadata, and/or programming code that permits or facilitates the operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the overlay detection and recognition component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and it can include one or more transformers to achieve a power level suitable for the operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or more remote computing devices 770. As an illustration, a remote computing device can be a personal computer, a portable computer, a server, a router, a network computer, a peer device or other common network node, and so on. As described herein, connections (physical and/or logical) between the computing device 710 and a computing device of the one or more remote computing devices 770 can be made via one or more traffic and signaling pipes 760, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device 710 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities.

Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for the detection and recognition of overlaid content within video content. It is, of course, not possible to describe every conceivable combination of elements and/or methods for purposes of describing the various features of this disclosure, but it can be recognize that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

The invention claimed is:

1. A method, comprising:
   receiving, by a computing system comprising at least one processor, data defining a sequence of frames corresponding to video content, wherein the sequence of frames spans a defined time interval less than a duration of the video content;
   determining, by the computing system, image changes between a first image represented by a first frame in the sequence of frames and a second image represented by a second frame in the sequence of frames, the second frame being consecutive to the first frame, wherein a first image change of the image changes corresponds to a difference between first image content present in a defined region in the first frame and second image content present in a defined region in the second frame;
   updating, by the computing system, a composite image frame using at least the image changes and a threshold value that discriminates between similar video content and dissimilar video content, the updating comprising,
      configuring blurred content based at least on a portion of the image changes and the threshold value;
      replacing a portion of the video content with the blurred content in the composite image frame;
      determining to retain a second portion of the video content based at least on a second portion of the image changes and the threshold value; and
      adding a second portion of the video content to the composite image frame;
   segmenting the composite image frame, resulting in a first composite image having a first area representing first static content in the video content and a second composite image having a second area representing second static content in the video content; and
   classifying, using the first composite image, the first area as a brand logo.

2. The method of claim 1, wherein the classifying comprises identifying the logo by applying at least one of a machine-learning classification model or an optical character recognition (OCR) technique to the first composite image, and wherein the machine-learning classification model defines a convolutional neural network.

3. The method of claim 1, wherein the defined region in the first frame and the defined region in the second frame correspond to a defined tile in a lattice of tiles that partitions each one of the first frame and the second frame, the defined tile comprising multiple pixels.

4. The method of claim 1, wherein the classifying comprises generating metadata characterizing the logo within the video content, wherein the metadata comprise multiple sets of coordinates and an identifier (ID) for at least one of the multiple sets of coordinates, and wherein a subset of the multiple sets of coordinates defines a boundary for an area that contains the logo within the first composite image, and further wherein the ID indicates a retailer that supplies the video content.

5. A method, comprising:
   receiving, by a computing system comprising at least one processor, data defining a sequence of frames corresponding to video content, wherein the sequence of frames spans a defined time interval;
   determining, by the computing system, image changes between contiguous images represented by contiguous frames in the sequence of frames, wherein a first subset of the image changes indicates static content within the video content and a second subset of the image changes indicates non-static content;
   generating, by the computing system, a composite image using at least the first subset of the image changes and the second subset of the image changes, wherein the composite image includes an area representing the static content;
   classifying, by the computing system, using the composite image, the area as a defined visual element, wherein the classifying comprises generating metadata characterizing the defined visual element; and
   sending, by the computing system, the metadata to a data storage device.

6. The method of claim 5, wherein the defined visual element comprises a brand logo or textual markings.

7. The method of claim 5, wherein the generating comprises:
   configuring a defined type of image content based at least on (a) the image changes and (b) a threshold value that discriminates between similar video content and dissimilar video content;
   replacing the non-static content with the defined type of image content in a composite image frame; and
   adding the static content to the composite image frame.

8. The method of claim 7, wherein the generating further comprises generating the area representing the static content by segmenting the composite image frame.

9. The method of claim 5, wherein the classifying comprises identifying the defined visual element by applying at least one of a machine-learning classification model or an optical character recognition (OCR) technique to the composite image.

10. The method of claim 5, wherein determining the images changes comprises determining a difference between first image content present in a defined region in a first frame of the contiguous frames and second image content present in a defined region in a second frame of the contiguous frames.

11. The method of claim 5, wherein the metadata comprise multiple sets of coordinates and an identifier (ID) for at least one of the multiple set of coordinates, and wherein a subset of the multiple sets of coordinates defines a boundary for an area that contains the defined visual element within the composite image, and further wherein the ID indicates a source of the video content.

12. A computing system, comprising:
   at least one processor; and
   at least one memory device having computer-executable instructions stored thereon that, in response to execution by the at least one processor, cause the computing system to:
      receive data defining a sequence of frames corresponding to video content, wherein the sequence of frames spans a defined time interval;
      determine image changes between contiguous images defined by contiguous frames in the sequence of frames, wherein a first subset of the image changes indicates static content within the video content and a second subset of the image changes indicates non-static content;
      generate a composite image using at least the first subset of image changes and the second subset of image changes, wherein the composite image includes an area representing the static content, and wherein generating the composite image further comprises generating the area representing the static content by segmenting the composite image frame; and classify, using the composite image, the area as a defined visual element.

13. The computing system of claim 12, wherein the defined visual element comprises a brand logo or textual markings.

14. The computing system of claim 12, wherein generating the composite image comprises:

configuring a defined type of image content based at least on (a) the image changes and (b) a threshold value that discriminates between similar video content and dissimilar video content;

replacing the non-static content with the defined type of image content in a composite image frame; and adding the static content to the composite image frame.

15. The computing system of claim 12, wherein classifying the area as the defined visual element comprises identifying the defined visual element by applying at least one of a machine-learning classification model or an optical character recognition (OCR) technique to the composite image.

16. The computing system of claim 12, wherein determining the image changes comprises determining a difference between first image content present in a first defined region in a first frame of the contiguous frames and second image content present in a second defined region in a second frame of the contiguous frames, and wherein each one of the first defined region and the second defined region corresponds to a tile in a lattice of tiles that partitions the first frame and the second frame.

17. The computing system of claim 12, wherein classifying the area as the defined visual element comprises generating metadata characterizing the defined visual element, and wherein the at least one memory has further computer-executable instructions that, in response to execution by the at least one processor, cause the computing system to send the metadata to a data storage device.

18. The computing system of claim 17, wherein the metadata comprise multiple sets of coordinates and an identifier (ID) for at least one of the multiple set of coordinates, and wherein a subset of the multiple sets of coordinates defines a boundary for an area that contains the defined visual element within the composite image, and further wherein the ID indicates a source of the video content.

* * * * *